Figure 1:
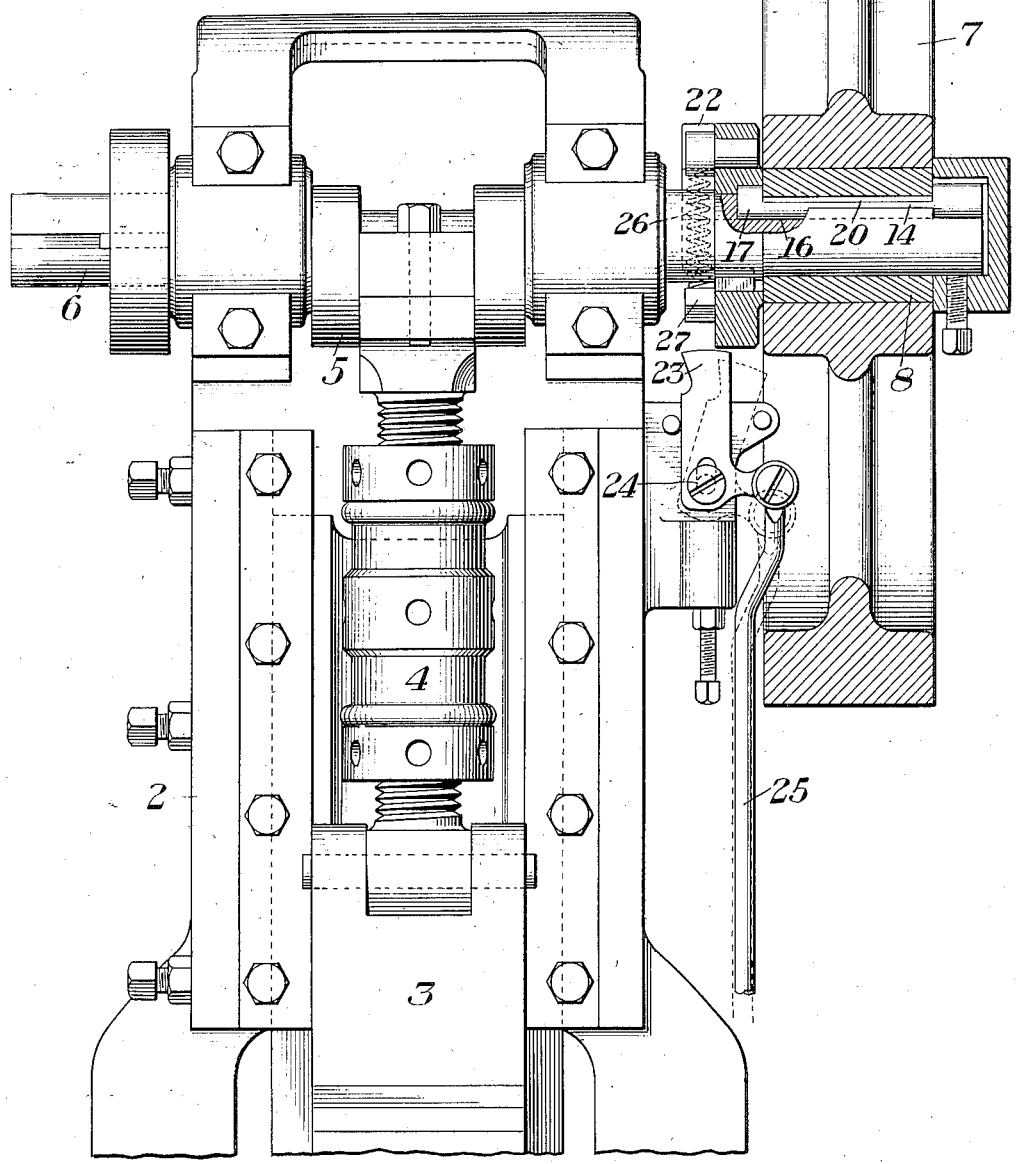

J. A. McGINNIS.
CLUTCH MECHANISM.
APPLICATION FILED NOV. 15, 1913.

1,103,679.

Patented July 14, 1914.
2 SHEETS—SHEET 1.

WITNESSES
R. A. Balderson
Jesse B. Heller

INVENTOR
John A. McGinnis
by Bakewell Byrnes & Parmelee
his attys

J. A. McGINNIS.
CLUTCH MECHANISM.
APPLICATION FILED NOV. 15, 1913.
1,103,679.
Patented July 14, 1914.
2 SHEETS—SHEET 2.
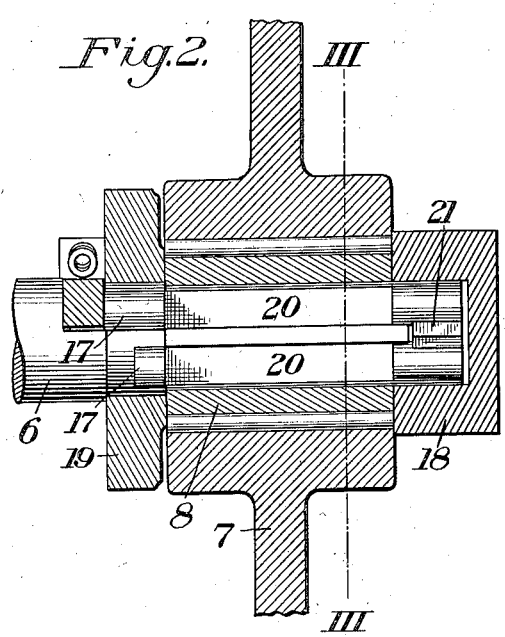
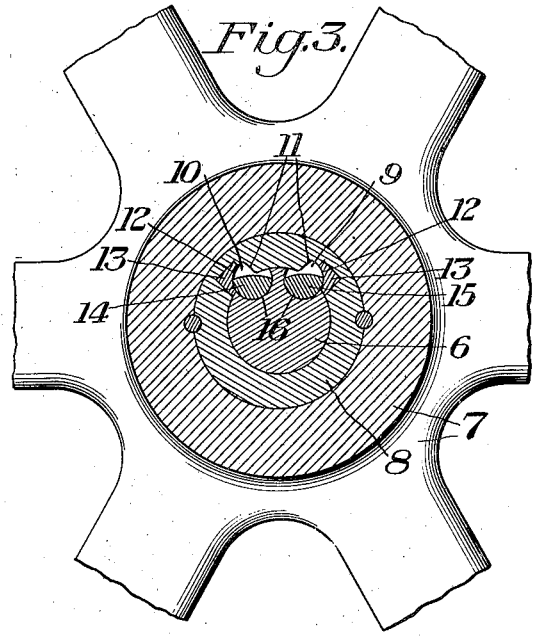
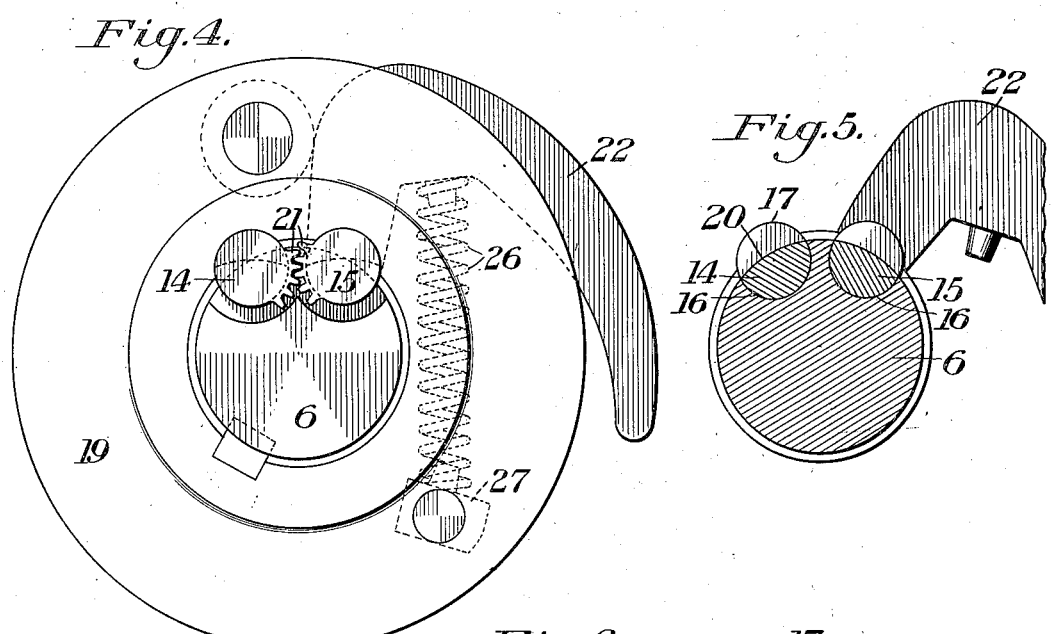
WITNESSES
R. A. Balderson
Jesse B. Heller
INVENTOR
John A. McGinnis
by Bakewell Byrnes & Parmelee
his attys

UNITED STATES PATENT OFFICE.

JOHN A. McGINNIS, OF BRIDGEPORT, OHIO, ASSIGNOR TO WHEELING STAMPING COMPANY, OF WHEELING, WEST VIRGINIA, A CORPORATION OF WEST VIRGINIA.

CLUTCH MECHANISM.

1,103,679.      Specification of Letters Patent.      Patented July 14, 1914.

Application filed November 15, 1913. Serial No. 801,114.

*To all whom it may concern:*

Be it known that I, JOHN A. McGINNIS, a citizen of the United States, and resident of Bridgeport, in the county of Belmont and State of Ohio, have invented a new and useful Improvement in Clutch Mechanisms, of which the following is a full, clear, and exact description, reference being had to the accompanying drawings, forming part of this specification, in which—

Figure 1 is a view partly in front elevation and partly in vertical section of a portion of a press having my invention applied thereto; Fig. 2 is a detail sectional view showing the clutch; Fig. 3 is a section on the line III—III of Fig. 2; Fig. 4 is an end view of the clutch mechanism with the drive wheel removed; Fig. 5 is a detail sectional view showing the clutch members in their release positions; and Fig. 6 is a perspective view of one of the clutch members removed.

My invention has relation to clutch mechanism.

While adapted to a large variety of uses, the invention has been more particularly designed by me for use in connection with power-operated metal-working presses of the type employing a reciprocating head.

My invention relates more particularly to clutch mechanism of that type which employs a rotary clutch member seated between the driving and driven members of the machine to which it is applied, and so shaped that when in one position the driving member can rotate freely over it. When moved to its other position it projects into clutching engagement with the driving member. Considerable difficulty has been experienced with clutch mechanism of this type heretofore, especially when applied to machines of the class above referred to, owing to the fact that there has been some lost motion between the driving and the driven members; and also because of the fact that the clutches would not positively lock the driven member against movement independent of the driving member. Consequently, when used on a press having a vertically reciprocating head operated by a crank on the driven shaft, as soon as the crank passed center on approaching its down stroke, the weight of the press head would rotate the shaft ahead of the driving wheel. Later in the stroke the driving wheel would catch up with the shaft and impart a severe shock to the machine. This has been very destructive on bearings, and it has been necessary to provide the shaft with a friction brake device to steady the movement of the shaft and save wear and tear on the machine.

The present invention is designed to overcome these difficulties by providing a clutch of this type with means whereby lost motion between the driving and driven members is prevented, and the driven member is locked against movement in either direction independently of that imparted to it by the driving member; and which will effect a saving in the amount of power required to operate the machine.

I will now refer to the accompanying drawings in which I have shown the preferred embodiment of my invention, and which will be described in detail, it being premised, however, that I do not limit myself to the use of the invention in connection with the particular kind of machine therein illustrated; and also that various changes can be made in the details of construction and arrangement of the various parts of the clutch mechanism without departing from the spirit and scope of my invention as defined in the appended claims.

In these drawings the numeral 2 designates the frame or housing of a power operated metal working press.

3 designates the usual vertically reciprocating press head connected to the pitman 4, which in turn is connected to the crank 5 of the driven power shaft 6.

7 designates the driving wheel which is loosely mounted on one end portion of the shaft 6 and which is arranged to be connected with and disconnected from said shaft by the clutch mechanism constituting the present invention.

8 is a suitable bushing which is seated and secured within the hub of the driving wheel 7. The inner surface of this bushing is provided with the two offset adjacent recesses 9 and 10, each of which has the angular wall 11 and the curved wall 12. These curved walls, which receive the wear of the clutch members, are preferably formed in whole or in part by means of hard metal inserts 13.

14 and 15 designate two rotary clutch members which are seated in semi-cylindrical recesses 16 in the end portion of the shaft 6. These clutch members each have cylindrical end portions 17, those at one end extending into the cap member 18 secured to the end of the shaft 6, and those at the opposite end extending into a collar 19, also secured to said shaft. The central portion of each clutch member is cut away as shown at 20 to give it an approximately semi-cylindrical form in cross section. The cylindrical end portions 17 within the cap 18 are formed with the intergearing toothed segments 21. The clutch member 15 at its other end is extended through the collar 19 and has rigidly connected thereto a cam wiper 22. This wiper normally rotates in contact with the upper end of an arm 23 which is pivoted to the frame of the machine at 24 and has a connecting rod 25 leading to the usual foot lever or treadle of the press (not shown). A compression spring 26 is interposed between the cam wiper and a fixed bearing 27 on the collar 19. This spring normally acts upon the cam wiper to rotate the two clutch members into the clutching positions shown in Figs. 3 and 4; that is to say, with portions of their cut-away parts rotated into driving engagement with the recesses 9 and 10 in the bushing 8. Normally, however, the action of the arm 23 upon the wiper 22 holds the spring 26 compressed, and the clutch members in the non-clutching positions shown in Fig. 5. When in these positions, the wheel 7 can rotate freely on the shaft 6. To throw the clutch in, the operator places his foot on the treadle lever, thereby moving the arm 23 from the position shown in full lines in Fig. 1 to the position shown in dotted lines. In the latter position it is out of the path of travel of the cam wiper; and when moved to this position the spring 26 immediately acts to rotate the clutch member into clutching engagement with the wheel 7. As soon as the operator releases the treadle pressure, the arm 23 returns to its normal position and the clutch members are moved back to their non-clutching positions.

It will be apparent that there is no lost motion possible between the driving member 7 and the driven member 6; and also (see Fig. 3) that when the clutch members are moved to clutching positions, the shaft is effectively locked against independent movement in either direction, and cannot run ahead of the driving wheel when the crank passes its upper center. This is effected by making the two recesses 9 and 10 of reverse form and by intergearing the two clutch members so that they rotate in reverse directions. The mechanism is extremely simple and its construction and arrangement has proven exceedingly efficient in its operation.

I claim:

1. Clutch mechanism, comprising a pair of clutch keys rotatably seated between the driving and driven members of a machine and rotatable into and out of clutching position, said members at one end portion having teeth which engage each other, and actuating means arranged to act upon one of said clutch members, substantially as described.

2. Clutch mechanism comprising a pair of intergeared clutch keys seated between the driving and driven members of a machine, a cam member fixed to one of said keys, a spring acting upon the cam member, and means arranged to be moved into and out of the path of the cam member; substantially as described.

In testimony whereof, I have hereunto set my hand.

JOHN A. McGINNIS.

Witnesses:
C. J. WARNAFELDT,
CHAS. S. MALONEY.